US009941042B2

(12) United States Patent
Bereschka

(10) Patent No.: US 9,941,042 B2
(45) Date of Patent: Apr. 10, 2018

(54) ELECTROMAGNETIC ACTUATING APPARATUS

(71) Applicant: HYDAC ELECTRONIC GMBH, Saarbruecken (DE)

(72) Inventor: Andreas Bereschka, Bousbach (FR)

(73) Assignee: HYDAC ELECTRONIC GMBH, Saarbruecken (DE)

(*) Notice: Subject to any disclaimer, the term of this patent is extended or adjusted under 35 U.S.C. 154(b) by 0 days.

(21) Appl. No.: 14/896,678

(22) PCT Filed: Jun. 14, 2014

(86) PCT No.: PCT/EP2014/001618
§ 371 (c)(1),
(2) Date: Dec. 8, 2015

(87) PCT Pub. No.: WO2014/206537
PCT Pub. Date: Dec. 31, 2014

(65) Prior Publication Data

US 2016/0118174 A1 Apr. 28, 2016

(30) Foreign Application Priority Data

Jun. 28, 2013 (DE) ........................ 10 2013 010 833

(51) Int. Cl.
*H01F 7/00* (2006.01)
*H01F 7/16* (2006.01)
(Continued)

(52) U.S. Cl.
CPC ............. *H01F 7/1615* (2013.01); *H01F 7/13* (2013.01); *H01F 7/1607* (2013.01); *H01F 2007/085* (2013.01); *H01F 2007/1661* (2013.01)

(58) Field of Classification Search
CPC ...................................................... H01F 7/1607
(Continued)

(56) References Cited

U.S. PATENT DOCUMENTS 3,755,766 A * 8/1973 Read, Jr. ............ H01H 51/2209 335/229
3,900,822 A * 8/1975 Hardwick ................. H01F 7/13 335/256

(Continued)

FOREIGN PATENT DOCUMENTS

DE 37 34 037 2/1989
DE 103 27 209 9/2004

(Continued)

OTHER PUBLICATIONS

International Search Report dated Aug. 6, 2014 in International (PCT) Application No. PCT/EP2014/001618.

*Primary Examiner* — Alexander Talpalatski
(74) *Attorney, Agent, or Firm* — Wenderoth, Lind & Ponack, L.L.P.

(57) ABSTRACT

An electromagnetic actuating apparatus, in particular a proportional magnet or switching magnet, includes a magnet armature (4) guided for axial movement in a pole tube (2). The pole tube is at least partially surrounded by a coil winding and is adjoined by a pole core (10) via a separating region (20) forming a magnetic decoupling. On energization of the coil winding (52), a magnetic force acts on the armature (4) to move the armature (4) in the direction of the pole core (10) within a travel area. At least one insert (28) of ferromagnetic material with a preset axial thickness is between the armature (4) and the pole core (10) to shorten, as desired, the axial length of the travel area.

14 Claims, 6 Drawing Sheets

(51) Int. Cl.
*H01F 7/13* (2006.01)
*H01F 7/08* (2006.01)

(58) Field of Classification Search
USPC .......................................... 335/281, 85, 126
See application file for complete search history.

(56) References Cited

U.S. PATENT DOCUMENTS

| | | | | | |
|---|---|---|---|---|---|
| 4,253,493 | A * | 3/1981 | English | F01L 9/04 | 137/625.18 |
| 4,518,938 | A * | 5/1985 | Bartholomaus | H01F 7/1607 | 335/255 |
| 4,845,451 | A * | 7/1989 | Uetsuhara | H01F 7/088 | 335/257 |
| 4,919,390 | A * | 4/1990 | Ichiryu | H01F 7/1607 | 251/129.15 |
| 5,050,840 | A * | 9/1991 | Kondo | H01F 7/1607 | 251/129.08 |
| 6,292,077 | B1 * | 9/2001 | Kaizuka | H01F 7/1607 | 335/255 |
| 6,352,238 | B1 * | 3/2002 | Roman | F16K 31/402 | 251/129.15 |
| 6,688,334 | B2 * | 2/2004 | Kawamura | F16K 31/0613 | 137/625.65 |
| 7,852,178 | B2 * | 12/2010 | Bush | H01H 51/2209 | 335/126 |
| 8,138,871 | B2 * | 3/2012 | Gruen | B23K 11/26 | 251/129.15 |
| 8,138,872 | B2 * | 3/2012 | Yoshihara | H01F 7/1615 | 335/124 |
| 8,179,217 | B2 * | 5/2012 | Kawaguchi | H01F 7/1615 | 335/124 |
| 8,245,956 | B2 * | 8/2012 | Dragone | F02M 51/06 | 239/533.2 |
| 8,493,166 | B2 * | 7/2013 | Golz | B23F 1/02 | 335/229 |
| 2003/0006391 | A1 * | 1/2003 | Mayr | F16H 61/0251 | 251/129.18 |
| 2004/0201441 | A1 * | 10/2004 | Elendt | F01L 13/0036 | 335/179 |
| 2009/0002109 | A1 * | 1/2009 | Stitz | H01F 7/081 | 335/281 |
| 2009/0314977 | A1 | 12/2009 | Beck et al. | | |
| 2011/0127357 | A1 * | 6/2011 | Leister | F02M 51/061 | 239/533.2 |
| 2011/0226974 | A1 | 9/2011 | Bill et al. | | |
| 2012/0249272 | A1 * | 10/2012 | Willburger | H02K 26/00 | 335/272 |

FOREIGN PATENT DOCUMENTS

| | | |
|---|---|---|
| DE | 10 2004 017 089 | 10/2005 |
| DE | 10 2008 061 414 | 6/2010 |
| EP | 1 953 773 | 8/2008 |
| EP | 2 254 130 | 11/2010 |

* cited by examiner

ELECTROMAGNETIC ACTUATING APPARATUS

FIELD OF THE INVENTION

The invention relates to an electromagnetic actuator, in particular a proportional magnet or solenoid, with a magnet armature. The magnetic armature is guided in an axially movable manner in a pole tube at least partially surrounded by a coil winding. The pole tube is connected to a pole core via a magnetic decoupling forming a separation area. Upon energization of the coil winding, a magnetic force acts upon the armature, which magnetic force seeks to move the armature towards the pole core within a stroke chamber.

BACKGROUND OF THE INVENTION

Such electromagnetic actuators, in technical terminology also called proportional magnets or switching magnets, are freely available on the market in a variety of embodiments. An actuator provided in particular for actuating a valve of this type is described for example in DE 10 2008 061 414 A1. In such devices, the armature performs a stroke movement in the pole tube upon electrical energization of the associated coil winding. Upon de-energization of the coil winding, as a rule, the armature is returned to its home position by a restoring force. In most cases, the restoring force acts on the armature via an armature-connected actuator member, which is designed, for instance, rod-shaped, extends through the pole core and triggers a relevant actuation procedure, for instance, in an externally connected valve for controlling fluid flows. Depending on the application, a specific determined response behavior of the actuating device is required. More specifically, a certain course of the magnetic force-displacement curve is required for associated switching and control functions. The geometry of the pole tube in the transition region between the magnetic separation area and the pole core is particularly decisive for the course of this F-d curve. The manufacturer of such actuation devices then has to manufacture and offer different pole core systems, as needed, i.e. depending on whether a customer wants a rising characteristic, an approximately horizontal characteristic, or a falling characteristic. In particular for small quantities, customization to customer wishes leads to increased manufacturing costs.

SUMMARY OF THE INVENTION

With regard to this difficulty, the invention addresses the problem of providing an electromagnetic actuator that provides more universal capabilities and therefore makes for an efficient production.

According to the invention, this problem is basically solved by an electromagnetic actuator having, as one essential feature of the invention for a desired shortening of the axial length of the section of the stroke chamber located between the magnetic separation area on the pole tube and the pole core portion, at least one insert made of ferromagnetic material of a pre-specified axial thickness introduced between the armature and the pole core. This insert opens up the possibility of manufacturing a pole tube-pole core system in a standard size and then introducing an additional ferromagnetic element determining, as required, the length of the stroke chamber defining the characteristic curve available for a stroke of the armature between the magnetic separation area and the pole core. An optimum course of the force-displacement curve for the intended use is then attained.

Particularly advantageously, the portion of the stroke chamber adjacent to the separation area of the pole tube is formed by a recess in the pole core. The recess continues the guide of the armature formed by the pole tube and ends at the separation area in an edge-forming rim. The respective insert can applied to the bottom surface of the recess of the pole core. In doing so, the axial distance between the ferromagnetic insert and the rim of the pole core acting as magnetic control edge can be set to a desired length, for which a desired characteristic curve of the F-d curve is given.

Preferably, the respective insert can be attached on the bottom surface of the recess.

Advantageously, the armature has a rod-shaped actuating member, and a ferromagnetic annular disc of a pre-selected thickness surrounding the actuator member is provided as the respective insert.

For an optimum reliability, an anti-adhesion disc can be arranged in a conventional manner between the annular ferromagnetic disc and the armature.

In exemplary embodiments in which an end body is attached at the side facing away from the pole core end of the pole tube, which end body forms a stroke delimiter for the armature, different lengths of the total stroke available for the armature can be realized through an appropriate dimensioning of the end body for pole tubes produced in a standard size depending on the desires and requirements.

The respective annular ferromagnetic disc may be attached to the pole core by gluing or soldering or by a material deformation, for example by caulking the outer edge, or by caulking an annular groove formed in the bottom surface of the pole core.

Alternatively, the respective annular ferromagnetic disc can be attached by a sleeve bordering its peripheral edge, which sleeve is externally attached to an inner surface of the pole tube or pole core.

Furthermore, the respective annular ferromagnetic disc may be attached by a weld formed between the peripheral edge and the surface of the pole core.

In alternate exemplary embodiments, the arrangement can be made such that the respective annular ferromagnetic disc has a coaxial sleeve-shaped extension on the side facing away from the armature. This extension is secured in a bore of the pole core by an interference fit and is penetrated by the rod-shaped actuating member of the armature.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
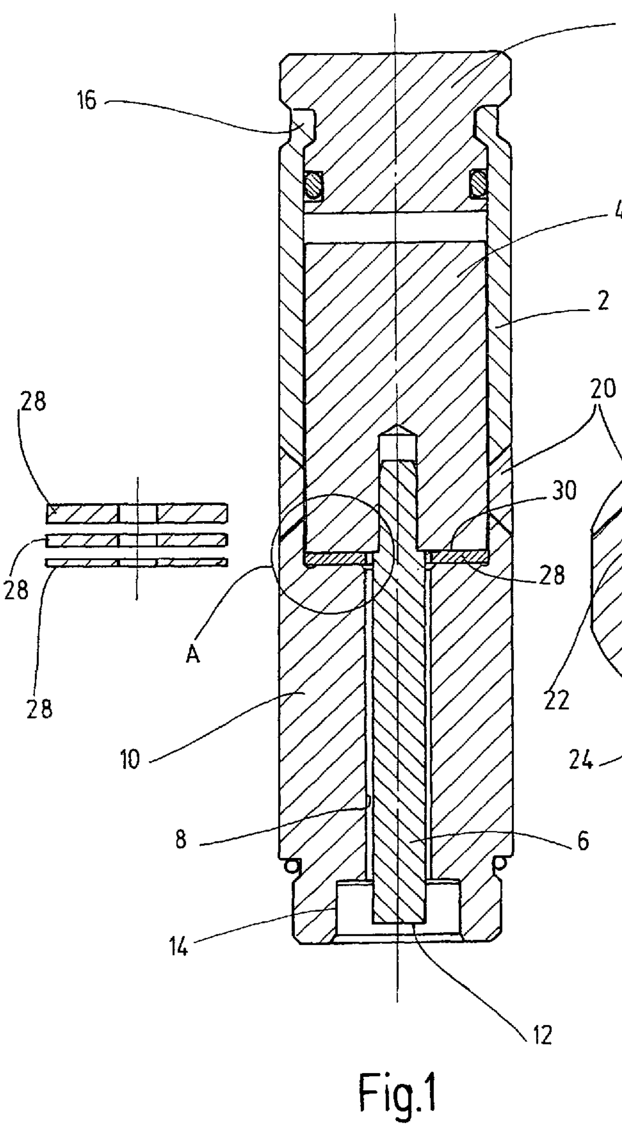
FIG. 1 is a side view in section of an actuator according to a first exemplary embodiment of the invention, wherein a selection of annular ferromagnetic discs of different thicknesses is shown separately.
Figure 1A:
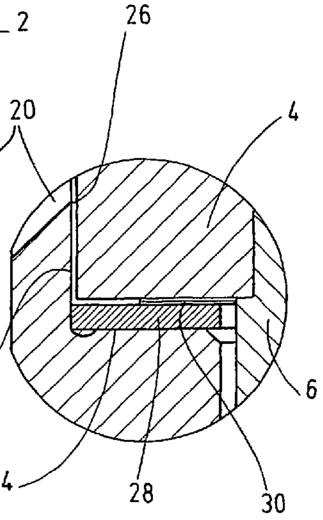
FIG. 1A is a greatly enlarged side view in section of the area designated as A in FIG. 1.

FIG. 1 shows a side view in section of an exemplary embodiment of the actuator according to the invention with an associated coil winding omitted. The coil winding is arranged in a manner known per se on the pole tube 2 and can have a current applied to it for actuation processes. In the pole tube 2, an armature 4 has one end with a coaxial rod-shaped actuating member 6 attached and is guided in an axially movable manner. Actuating member 6 extends through a through hole 8 in a pole core 10, such that the free end 12 of the actuating member 6 is accessible for an actuating process at a connecting part 14 of the pole core 10. An actuator is connected to the connecting part 14 with for example, the actuator being in the form of a valve (not shown in FIG. 1).

The example shown in FIG. 1 is designed as a "pushing magnet". The illustrated axial position corresponds to the fully energized state of excitation of the coil winding (not shown), with the armature 4 generating a compressive force via the actuating part 6 as an actuating force. A resetting device, returning the armature 4 upon termination of the energization in FIG. 1 upwardly, for example in the form of a return spring, is not shown in FIG. 1, as such a device can be designed according to prior art. To limit the length of the return stroke caused by a restoring force of the armature 4, an end body 18 is attached to the end of the pole tube 2, attached on the top in FIG. 1 by a crimp 16. By appropriate dimensioning of the end body 18, the stroke designed for the return stroke can be set to a desired length. The pole tube 2 is connected to the pole core 10 via a weld 20 that forms a separation area effecting a magnetic decoupling in a manner known per se. The guide formed on the inside of the pole tube 2 for the armature 4 continues through the separation area formed by the weld 20 in a recess 22, which recess is cylindrical in the pole core 10 and has a bottom surface 24 located in a radial plane. At the weld 20, the recess 22 terminates at an edge 26 that forms a sharpened edge surrounding the guiding surface of the armature 4.

In the illustration of FIG. 1, an annular ferromagnetic disc 28 made of a ferritic material is penetrated by the rod-shaped actuating member 6 and is inserted at the bottom surface 24 in the recess 22 of the pole core 10. An anti-adhesion disc 30 of conventional type is arranged between the annular disc 28 and the end of the armature 4. The annular disc 28 shown in an inserted state has a relatively low axial thickness. FIG. 1, shows by way of example, a selection of insertable annular discs 28 of different axial thicknesses. The thickness of the respective inserted annular disc 28 results in a corresponding shortening of the axial length of the stroke chamber available for armature 4 when moving in the direction of the pole core 10. The modification of the stroke chamber in the critical stroke range, which adjoins the magnetic separation area of the weld 20, affects the magnetic force-displacement curve, as shown in examples in FIGS. 2 and 3.

Figure 2:
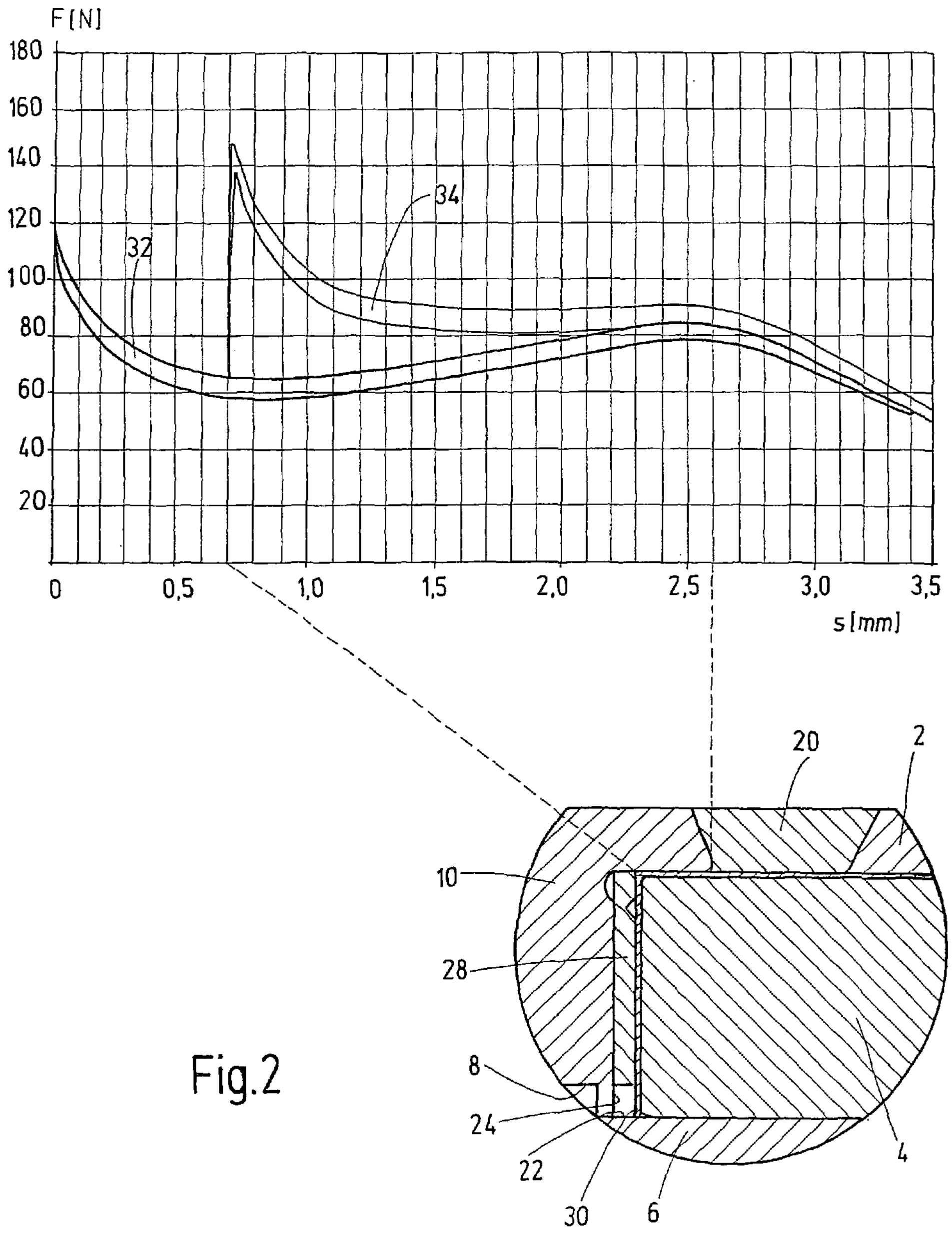
FIG. 2 is a side view in section corresponding to FIG. 1A, with an associated representation of the resulting characteristic curves without and with an inserted annular ferromagnetic disc, respectively.
Figure 3:
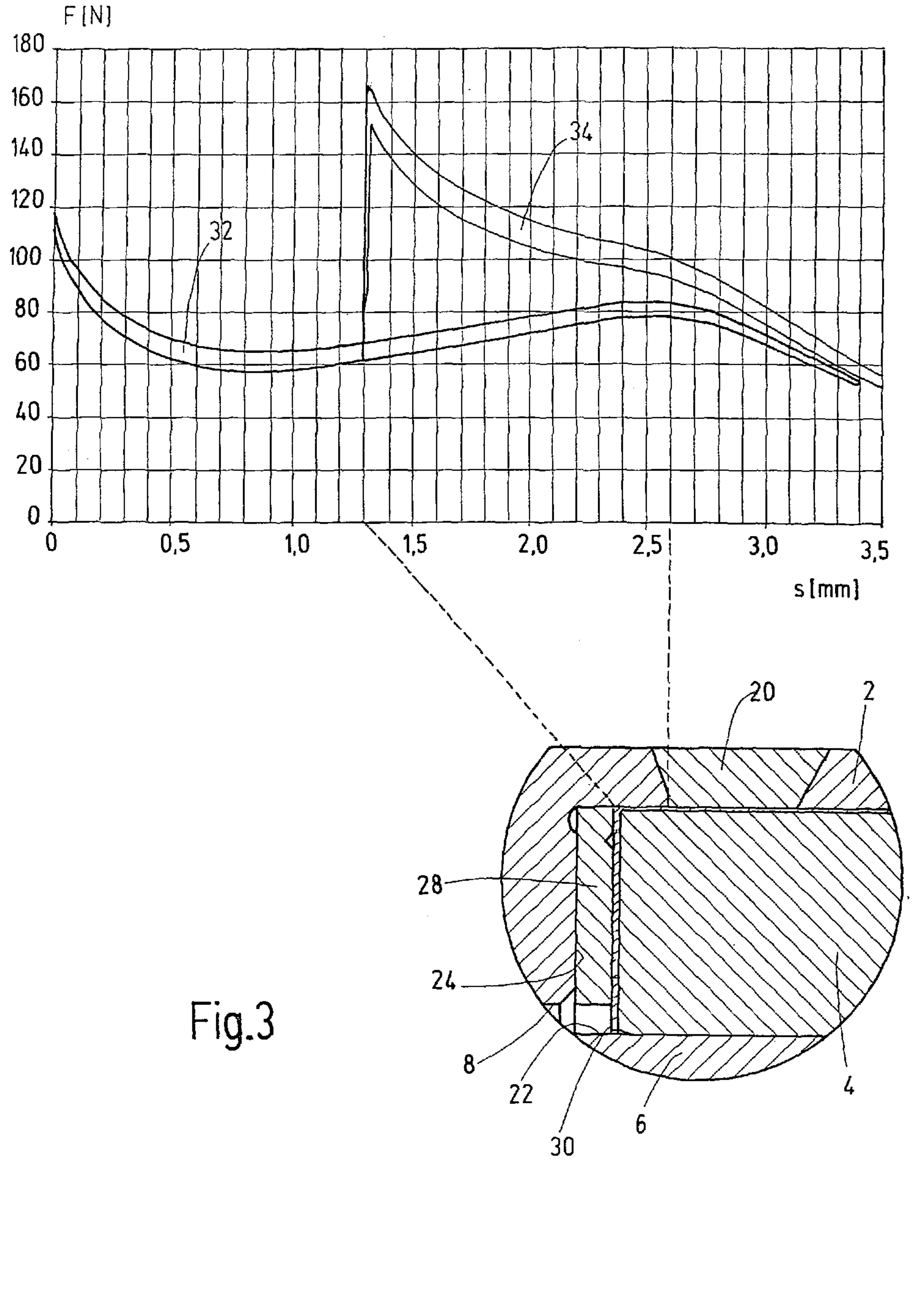
FIG. 3 is a side view in section corresponding to FIG. 2, where an annular ferromagnetic disc with a thickness larger than that of FIG. 2 has been inserted.
Figure 4:
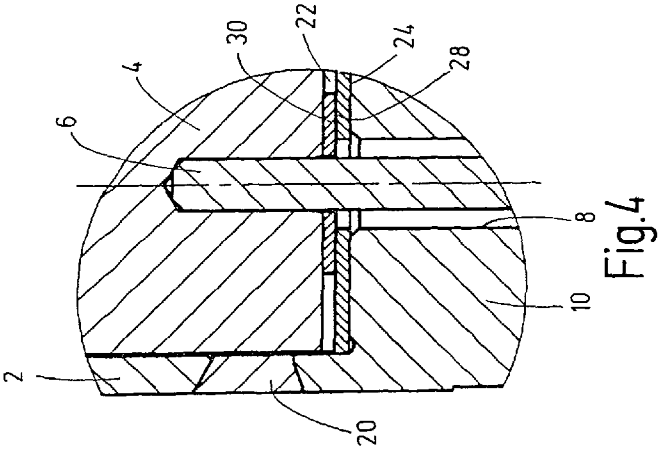
FIG. 4 is a partial side view in section, in which a part of the magnet armature with the actuating member, as well as the transition region between the pole tube and the pole core, are illustrated in accordance with a second exemplary embodiment of the invention.

FIG. 2 shows an example with an inserted annular disc 28 of lower thickness, while FIG. 3 shows an example with an annular disc 28 of greater thickness. In the example of FIG. 2, the characteristic curve 32 in a numbered F-d graph is without inserted annular disc 28, and the characteristic curved 34 is with an inserted annular disc 28 of a thickness of 0.7 mm. As can be seen, the inserted annular disc 28 results, via a mainly to be used standard stroke of approx. 1.5 mm to 2.5 mm, in a largely horizontal characteristic curve, whereas the characteristic curve 32 is inclined there, in contrast. In the example shown in FIG. 3 for an inserted annular disc 28 with a thickness of 1.3 mm, a sharp increase in force results in a higher maximum force with a smaller stroke, cf. characteristic curve 34. The choice exists, in manufacturing a pole tube-pole core system in a standard size, to realize a selected course of the F-d curve, depending on whether no annular ferromagnetic disc 28 is inserted or an annular disc 28 of predetermined thickness is inserted. With the same standard size, the stroke of the return stroke can also be determinable by selecting the dimensions of the respective end body 18.

Figure 5:
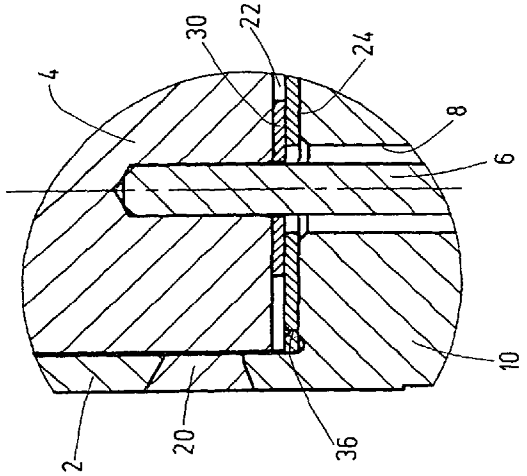
FIGS. 5 to 9 are partial side views in section of actuators according to third, fourth, fifth, sixth and seventh exemplary embodiments, respectively, of the invention, corresponding to FIG. 4.
Figure 6:
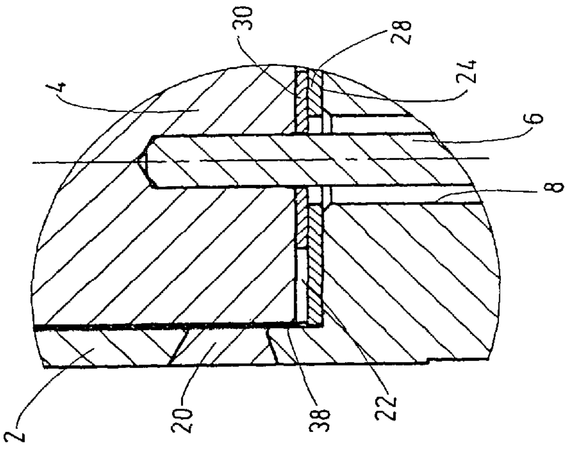

FIGS. 4 to 9 show further exemplary embodiments with a choice of possible types of the incorporation of an annular disc 28. For instance in the example of FIG. 4, the annular disc 28 is attached to the bottom surface 24 of the pole core 10 by adhesive bonding or brazing. In the example of FIG. 5, a connection is realized by mechanical deformation by external caulking 36 the annular disc 28 against the inner wall of the recess 22. FIG. 6 shows the attachment of the annular disc 28 by a sleeve 38, forming the guiding surface for the armature 4 on the inside of the pole tube 2 and the recess 22.

Figure 9:
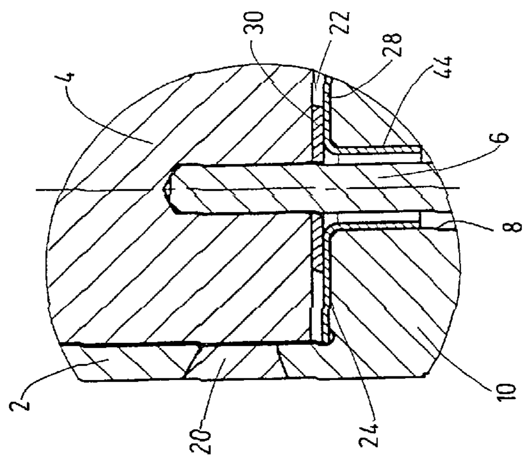
Figure 8:
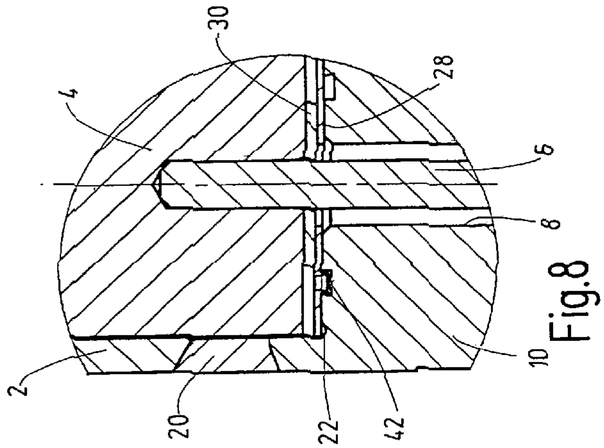
Figure 7:
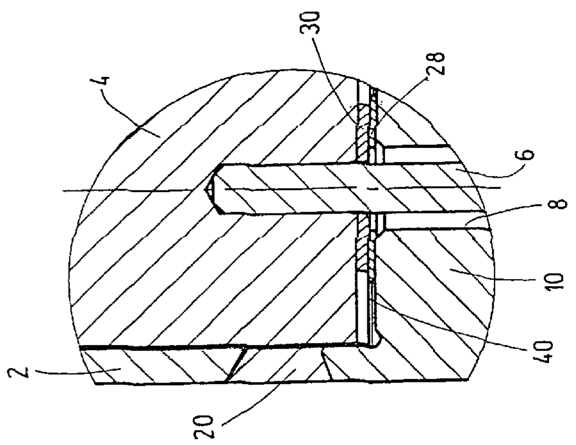

In the example of FIG. 7, a welded geometry 40 formed on the annular disc 28 is provided as the connection, while in the example of FIG. 8 in contrast, a mechanical deformation is provided by caulking the annular disc 28 into an annular groove 42 incorporated in the bottom surface 24. Finally, FIG. 9 shows an example, in which a specially shaped annular disk 28 has, on the side facing away from the armature 4, a coaxial sleeve-shaped extension 44, which is secured in the bore 8 of the pole core 10 by an interference fit.

Figure 10:
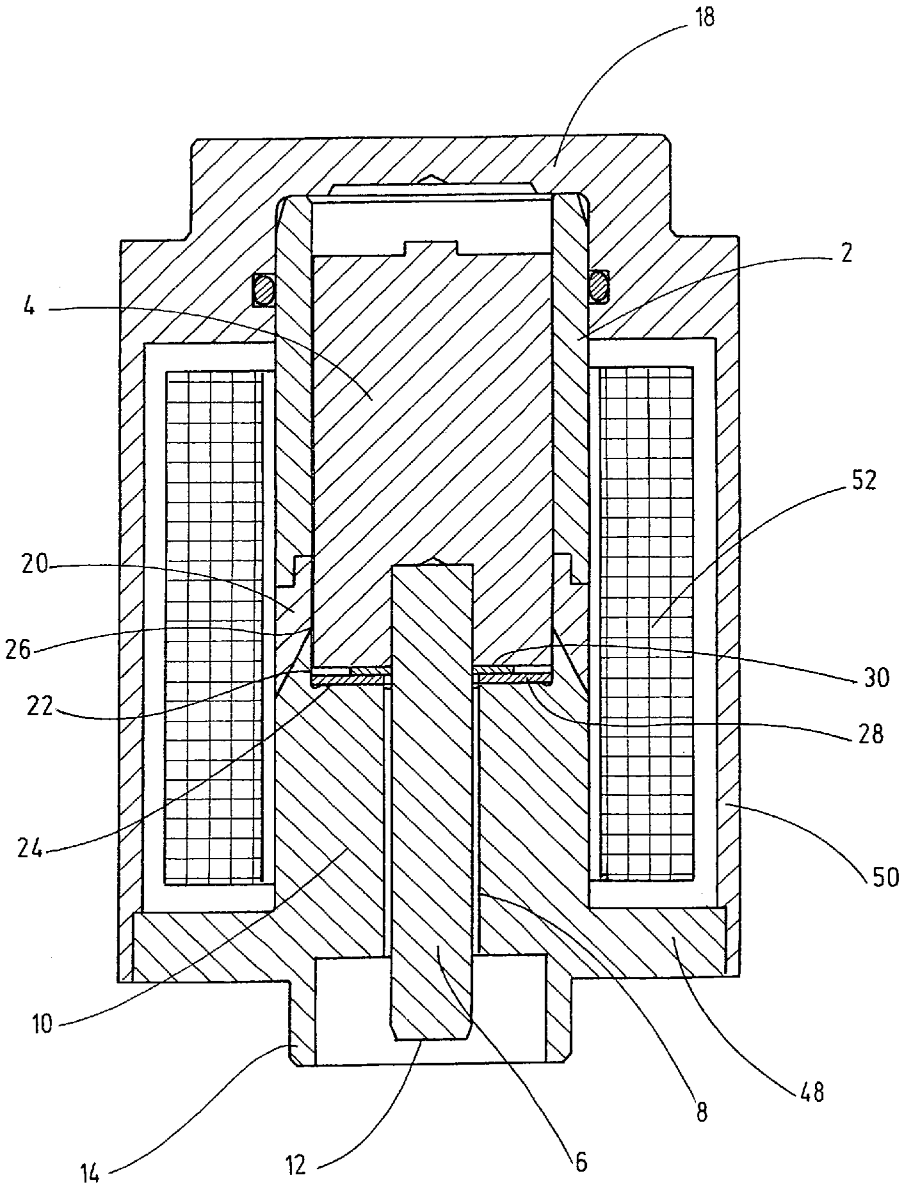
FIG. 10 is a side view in section of an actuating device according to an exemplary embodiment of the invention in the form of a compact magnet.

FIG. 10 shows an exemplary embodiment in which the invention has been implemented for a compact magnet. In contrast to the configuration shown in FIG. 1, the pole core 10 is designed shorter in relation to its diameter and has a flange-shaped radial extension 48 at the end having the connection member 14. The end body 18 forms the closed end of a pot-shaped housing 50, which extends down to the extension 48 of the pole core 10. The extension 48 closes the open end of the pot. Between the end body 18 and the extension 48 of the pole core 10, the housing 50 surrounds the coil winding 52, which in turn surrounds a large part of the pole tube 2 and the pole core 10. For the compact magnet shown in FIG. 10 the course of the F-d curve can be equally influenced by the selection of the introduced ferromagnetic annular discs 28.

While various embodiments have been chosen to illustrate the invention, it will be understood by those skilled in the art that various changes and modifications can be made therein without departing from the scope of the invention as defined in the claims.

The invention claimed is:

1. An electromagnetic actuator kit, comprising:

a pole tube at least partially surrounded by a coil winding and having a stroke chamber therein;

a pole core connected to said pole tube by a magnetic decoupling, said magnet decoupling forming a magnetic separation area;

a magnet armature axially movable in said stroke chamber in said pole tube upon energization of said coil winding generating a magnetic force acting on said armature to move said armature within said stroke chamber toward said pole core;

a plurality of ferromagnetic discs selectively inserted singularly or in combination in said stroke chamber and shortening and determining an axial length of said stroke chamber defining a characteristic curve for a stroke of said armature between magnetic separation area and pole core attaining an optimum force displacement curve for an intended use of the electromagnetic actuator, each of said ferromagnetic discs having a pre-specified and different axial thickness and being selectively located between said armature and said pole core; and a recess in the pole tube forming a portion of said stroke chamber adjacent to said magnetic separation area, said recess continuing a guide for said armature formed by said pole tube and ending at said magnetic separation area in an edge-forming rim, the selected ferromagnetic disc or discs being applied to a bottom surface of said recess.

2. An electromagnetic actuator kit according to claim 1 wherein said ferromagnetic discs are selectively attached to said bottom surface of said recess.

3. An electromagnetic actuator kit according to claim 1 wherein said armature comprises a rod-shaped actuating member; and each of said ferromagnetic discs is annular and selectively surrounds said actuating member.

4. An electromagnetic actuator kit according to claim 3 wherein an anti-adhesion disc is between one of said ferromagnetic discs and said armature.

5. An electromagnetic actuator kit according to claim 1 wherein an end body is attached at an end of said pole tube remote from said pole core and forms a stroke limiter for said armature.

6. An electromagnetic actuator kit according to claim 3 wherein said ferromagnetic discs are selectively attached to said pole core by at least one of gluing or soldering.

7. An electromagnetic actuator kit according to claim 3 wherein said ferromagnetic discs are selectively attached to said pole core by caulking.

8. An electromagnetic actuator kit according to claim 3 wherein said ferromagnetic discs are selectively attached by a sleeve bordering on an edge of the selected ferromagnetic disc or discs, said sleeve being attached to an inner surface of at least one of said pole tube or said pole core.

9. An electromagnetic actuator kit according to claim 3 wherein said ferromagnetic discs are selectively attached by a weld between a peripheral edge of the selected ferromagnetic disc or discs and said bottom surface of said pole core.

10. An electromagnetic actuator kit according to claim 3 wherein each of said ferromagnetic discs comprises a coaxial sleeve-shaped extension on a side of each said ferromagnetic disc facing away from said armature, said sleeve-shaped extension being secured in a bore of said pole core by an interference fit and being penetrated by a rod-shaped actuating member of said armature.

11. A process of manufacturing a pole tube-pole care system in a standard size, the process comprising the steps of:

providing an electromagnetic actuator having a pole tube at least partially surrounded by a coil winding with a stroke chamber in the pole tube, having a pole core connected to the pole tube by a magnetic decoupling with the magnet coupling forming a magnetic separation area and having a magnetic armature axially movable in the stroke chamber of the pole tube upon energization of the coil winding generating a magnetic force acting on the armature to move the armature within the stroke chamber toward said pole core; and introducing one or more of ferromagnetic discs having pre-selectable and different axial thicknesses in the stroke chamber between the armature and the pole core to determine a stroke length of the stroke chamber and to define a characteristic curve for a stroke of the armature between the magnetic separation area and pole core resulting in attaining an optimum course of a force displacement curve for an intended use.

12. A process according to claim 11 wherein the selected ferromagnetic disc or discs are applied to a bottom surface of a recess in the pole tube forming a portion of the stroke chamber adjacent to the magnetic separation area, the recess continuing a guide for the armature formed by the pole tube and ending at the magnetic separation area in an edge forming region.

13. An electromagnetic actuator formed by the process of claim 12.

14. An electromagnetic actuator formed by the process of claim 11.

* * * * *